United States Patent [19]

Hirosawa

[11] 4,395,752
[45] Jul. 26, 1983

[54] DIGITAL CONTROL PROCESS WITH INVERSE FUNCTION TABLE MEMORY

[75] Inventor: Makoto Hirosawa, Kyoto, Japan

[73] Assignee: Dainippon Screen Mfg. Co., Ltd., Kyoto, Japan

[21] Appl. No.: 218,687

[22] Filed: Dec. 22, 1980

[30] Foreign Application Priority Data

Jan. 8, 1980 [JP] Japan .................................. 55-1017
Sep. 24, 1980 [JP] Japan ............................... 55-133442

[51] Int. Cl.³ ........................................... G06F 15/46
[52] U.S. Cl. .................................... 364/130; 364/553
[58] Field of Search ............... 364/130, 148, 152, 183, 364/191, 192, 193, 553, 550, 551, 570; 318/561

[56] References Cited

U.S. PATENT DOCUMENTS

| | | | |
|---|---|---|---|
| 3,862,403 | 1/1975 | Kurihara | 364/553 X |
| 3,878,724 | 4/1975 | Allen | 364/553 X |
| 4,286,318 | 8/1981 | Immink et al. | 364/553 X |

Primary Examiner—Joseph F. Ruggiero
Attorney, Agent, or Firm—Brumbaugh, Graves, Donohue & Raymond

[57] ABSTRACT

A control process to keep input and output of the whole control system equal while measuring the input-output characteristics of the object to be controlled during the blanking time of the equipment in operation as the measuring mode period, by writing and memorizing the measured input as the data of a random access memory and the measured output as the address of the RAM, and by using the RAM as the inverse function table memory during the control mode period that follows the measuring mode period.

6 Claims, 10 Drawing Figures

DIGITAL CONTROL PROCESS WITH INVERSE FUNCTION TABLE MEMORY

BACKGROUND OF THE INVENTION

Reproduction of a good quality print image from an original color photograph or picture depends on the color separation. Color separation is a process in which the original color picture is passed through blue, green and red filters respectively to produce cyan, magenta, yellow and black separations. Masking, a process to adjust differences between the original color and the ink color of the print, is also carried out. As compared to the optical camera separations in the traditional method, the scanner translates the highlight and shadow areas of the color original into electrical signals to carry out separations and masking while adjusting color tones and, at the same time, adjusting the magnification. Original images are recorded by the modulation of the quantity of light from a light source, such as a laser or glow lamp, but the modulation characteristic in the quantity of such light is generally not linear. Also, for a laser, time-oriented changes in the quantity of light are unavoidable.

An analog feed-back control system of continuous operation has been employed. This system, however, has such disadvantages as temperature drift due to the analog system, so that control is not possible during high-speed recording because the time delay is dependent on the modulation characteristic of the light source and because of difficulty in correcting non-linear modulation characteristic.

SUMMARY OF THE INVENTION

The primary object of the present invention is to provide a digital control process that enables linear arrangement of non-linear characteristics of modulators and others due to time-oriented variations such as drifting.

Another object is to provide a digital control process for making the control function universal, i.e., a control function that can be used with linear or nonlinear devices, by matching the input and output characteristics of the whole control system to a desired characteristic.

When it is necessary to correct time-oriented changes of an object for control, such as drifting, to make the operation of the equipment linear, it is desirable that the output value and setting value (input value to the control system) of the object can be controlled at an equal level, with no regard to the characteristics of the object.

The key point of this invention is in the use of a random access memory, RAM, as an inverse function table memory, and the input and output of the whole control system are kept equal by taking the blanking time during operation of the equipment as the measuring time, measuring the input-output characteristics of the object being controlled during the period, by writing and storing the measuring input as the data of the RAM and the output as the address of the RAM, and by using the RAM as the inverse function table memory during the control mode period that follows the measuring mode period. If the cycles of the measuring mode period and control mode period are set adequately fitting to the object to be controlled, the time-oriented variations of the object, such as characteristic drift, can be corrected. By providing a table memory that works as the desired function at the input side of this control system, the input-output characteristics of the system can be matched to any desired characteristic, thus the control function becomes universal.

Being a digital control system as described above, the control by an inverse function table memory proposed by this invention has such advantages that stable characteristics are obtained, high-speed operation is possible, since the correction data of the object are settled during the blanking time, and that any modulation characteristic can be changed to a desired one.

DETAILED DESCRIPTION FIRST EMBODIMENT

Figure 1:
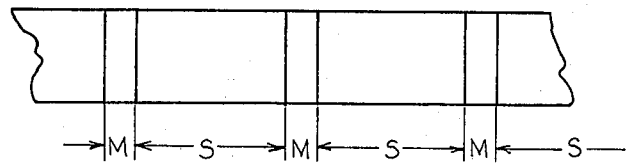
FIG. 1 is an explanatory drawing to show the relationship between the measuring mode period and control mode period.
Figure 2:
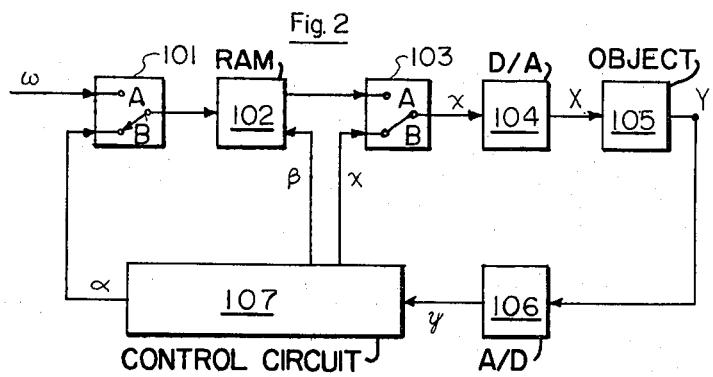
FIG. 2 is the block diagram of an embodiment according to this invention.

Referring to FIG. 1 and FIG. 2, the selector (101)(103) respectively selects the B-contact during the measuring mode period (M) and the A-contact during the control mode period (S). The RAM (102) reads and writes the data ($\beta$) and the address ($\alpha$) as a pair through the control circuit (107). The digital-to-analog, D/A, converter (104) is driven by the digital signal (x) and the object for control (105) is driven by the analog signal (X). The analog-to-digital, A/D, converter (106) converts the analog output (Y) of the object for control (105) into digital output (y).

The control system according to this invention is so composed to perform the control operation during the measuring mode period (M) and the control mode period (S). A description of the control principle and operation during the two mode periods is set forth below.

MEASURING MODE PERIOD (M)

Figure 3:
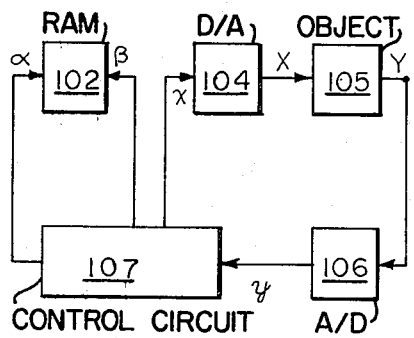
FIG. 3 is a principle drawing of the operation during the measuring mode period by the control system of this invention.

Since the selectors (101) and (103) select respectively the B-contact in the circuit of FIG. 2 during this period, the composition is as shown in FIG. 3. The digital measuring input (x) from the control circuit (107) is applied to the D/A converter (104) and is applied to the object to be controlled (105) as the analog signal (X) to which generates the analog output (Y). The output (Y) is converted into a digital quantity (y) by the A/D converter (106) and transferred to the control circuit (107). Corresponding to the input-output characteristics of the object to be controlled, the relation between the digital measuring input (x) and the digital output (y) of the object to be controlled (105) converted by the A/D converter (106) is shown by the following equation (1) under this condition.

$$y = f(x) \ldots \qquad (1)$$

Now the input (x) through the control circuit (107) is written in the address ($\alpha$) of the RAM (102) as the data ($\beta$). If the address ($\alpha$) is equal to the output signal (y), the following relation is established between the address ($\alpha$) and the data ($\beta$) of the RAM (102).

$$\alpha = f(\beta) \ldots \qquad (2)$$

Accordingly, if the data ($\beta$) is called by the address ($\alpha$) of the RAM (102) as the table memory, $$\beta = f^{-1}(\alpha) \ldots \qquad (3)$$

Thus, the following relation, i.e. the inverse function is obtained:

$$x = f^{-1}(y) \ldots \qquad (4)$$

A description of the algorithm of the inverse function and the operation of the control circuit (107) during the measuring mode period (M) is set forth below.

In FIG. 3, the input (X) to the object to be controlled (105) is given as the digital measuring input (x) through the D/A converter and the output (Y) of the object is applied to the control circuit (107) as the digital signal (y) through the A/D converter (106). Accordingly, both the digital measuring input (x) and the digital signal (y) are shown as an integer. If the values of digital measuring input (x) are $$x = x_0, x_1, x_2, \ldots, x_N \ldots \qquad (5)$$

$$(x_{n+1} = x_n + 1)$$

and the digital signal values (y) to respective digital measuring input (x) are $$y = y_0, y_1, y_2, \ldots, y_N \ldots \qquad (6)$$

Figure 9:
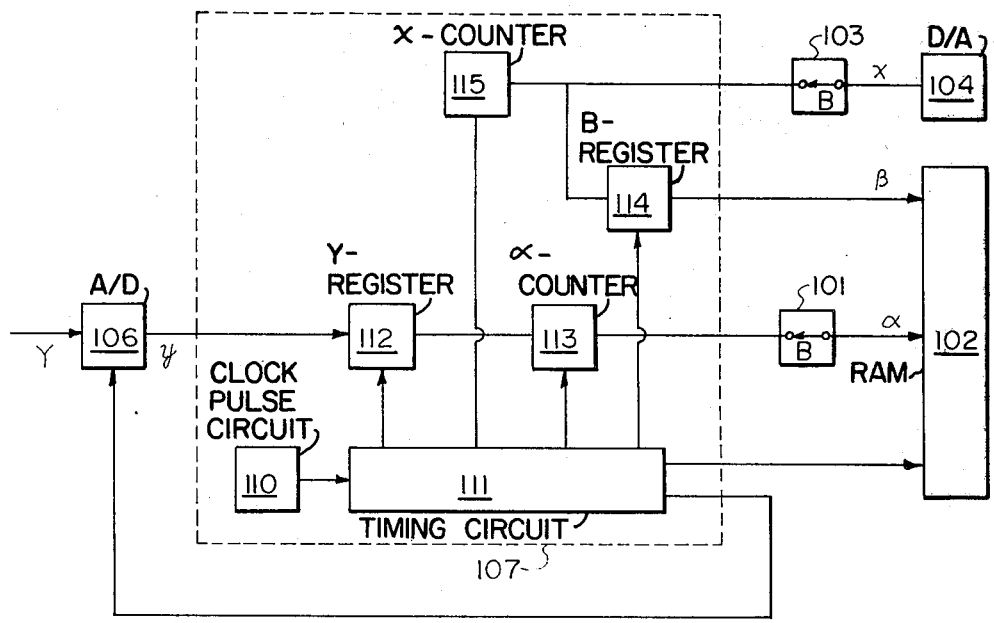
FIG. 9 is the partial block diagram of the control circuit shown in FIGS. 2, 3, 5 and 7.

The operation of the control circuit (107) in FIG. 9 is set forth below.

(1) The value of x, i.e. $x_0$ and is set on the x-counter (115), applied to the object to be controlled (105) through the D/A converter (104), then the value of y, $y_0 = f(x_0)$, is obtained by the A/D converter (106) and is set on the y-register (112). These operations are shown in FIG. 8: the measuring mode start (21), obtaining of the signal (y) after getting the signal (x), which is schematically illustrated in block (22).

Figure 8:
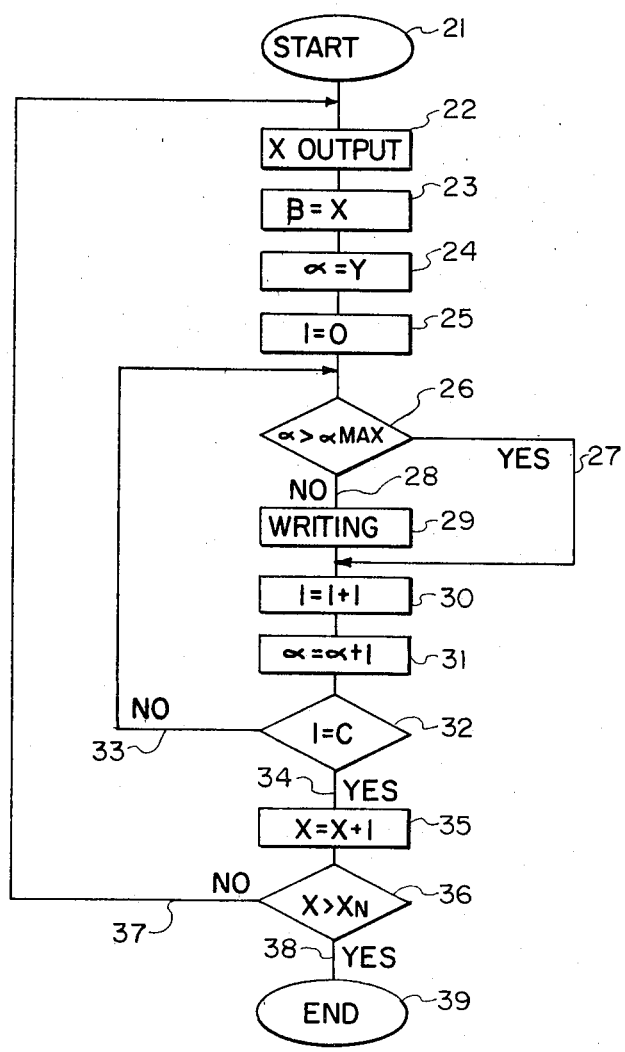
FIG. 8 is a flow chart to show the write and memory process of the RAM during the measuring mode period according to this invention.

(2) The data $x_0$ is written into the $\beta$-register (114), and the value is taken as $\beta$, which is shown in FIG. 8 as $\beta = x$ (23).

(3) From the y-register (112), the value of $y_0$ is written into the $\alpha$-counter (113), and the value is taken as $\alpha$: $\alpha = y$ (24) in FIG. 8.

(4) By counting up the $\alpha$-counter (113) from $\alpha$ to $\alpha + C$, the value of $\beta$ is written into $\alpha$ addresses up to $\alpha + C$ addresses, in which C is an integer constant of the RAM (102). These are shown in FIG. 8: i=0 (25), $\alpha > \alpha$max, $\alpha$max: the maximum value of RAM address (26), yes (27), no (28), written into the table memory as address ($\alpha$) and data ($\beta$) (29), i=i+1 (30), $\alpha = \alpha + 1$ (31), i=C (32), no (33), and yes (34).

(5) The value of x changes to (x+1) to return to the operation of the above (1). That is $x = x+1$ (35), $x > x_N$ (36), and no (37) in FIG. 8.

(6) When the value of x exceeds the final value $x_N$, writing into the RAM (102) is suspended. That is yes (38) and measuring mode stop (39).

In the above operation (4), the same data could be written into more than one address so as to prevent any address having no writing since the value (y) is not necessarily increased by one from $y_n$ to $y_n + 1$, when x is increased by one to x+1. Accordingly, the value of integer constant (C) is settled adequately in the control system. If the memory capacity of RAM (102) is exceeded after the address is counted up, no writing is made. The above processes are shown as a flow chart in FIG. 8.

The block diagram of the control circuit (107) in FIG. 2 and FIg. 3 is as shown in FIG. 9.

CONTROL MODE PERIOD (S)

Figure 4:
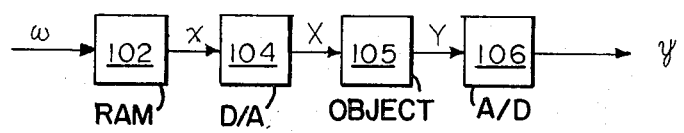
FIG. 4 is a principle drawing of the operation during the control mode period by the control system of this invention.

Since the selectors (101)(103) select the A-contact in the circuit of FIG. 2 during this period, the composition is as shown in FIG. 4. The address of the RAM (102) is obtained by the digital input ($\omega$) to the control system, the data are given as the output (x), the analog output (X) is given by the D/A converter (104) to be applied to the object for control (105), thus the output (Y) is obtained and the digital output (y) is given by the A/D converter (106). Accordingly, from the above equation (3), i.e. $\beta = f^{-1}(\alpha)$, the following equation is obtained:

$$x = f^{-1}(\omega)$$

From the above equation (1), the relation between the input ($\omega$) to the control system and the digital output (y) of the object to be controlled (105) is, $$y = f(x)$$

Accordingly, $$y = f\{f^{-1}(\omega)\}, \ y = \omega$$

Therefore, the input ($\omega$) to the control system is kept equal to the digital output (y) of the object to be controlled (105) at all times.

As described above, the system according to this invention is featured by the operation that keeps the digital output (y) of the object to be controlled equal to the input ($\omega$) to the control system at all times with no regard to the input-output characteristics of the object (105).

CONTROL CIRCUIT (107)

Figure 10:
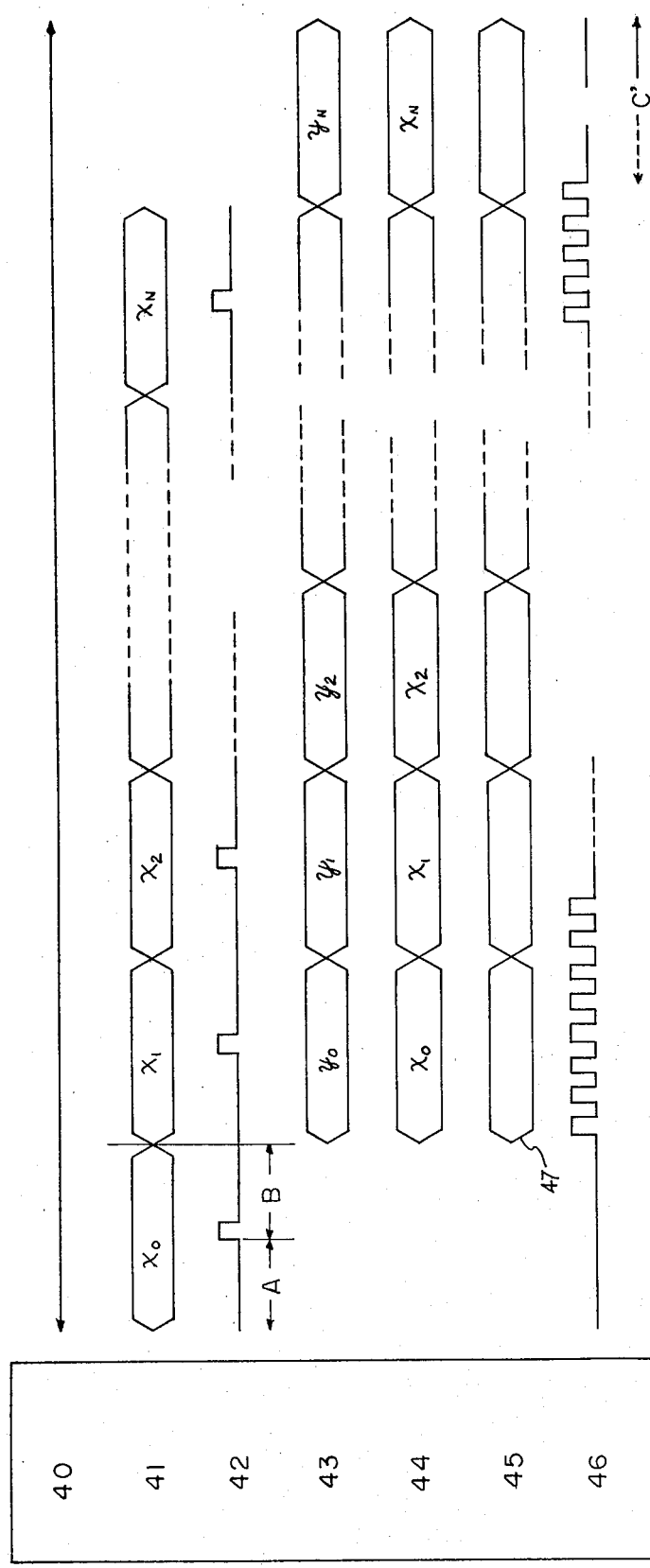
FIG. 10 is the timing chart of the operation of the control circuit according to this invention.

Referring to FIG. 9, the clock pulse from a clock pulse generation circuit (110) is transmitted to the timing circuit (111). Also, the circuit (111) provides an operation pulse that is sent to the x-counter (115), $\alpha$-counter (113), A/D converter (116), y-register (112), $\beta$-register (114) and RAM (102). The timing chart of the above is as shown in FIG. 10, in which measuring mode (40), x-counter (41), A/D counter start pulse (42), y-register (43), $\beta$-register (44), $\alpha$-counter (45) and memory writing pulse (46) are respectively operated. In the $\alpha$-counter (45), each period (47) shows $y_0, y_0+1, \ldots, y_0+C; y_1, y_1+1, \ldots, y_1+C; \ldots; y_N, y_N+1, \ldots,$ $y_N + C$. In other words, the pulse is applied to the x-counter (115) so that the count is increased by one at every certain period (P). After A seconds from the pulse generation, the operation pulse of the A/D conversion circuit is applied, and after B seconds from the operation pulse, the writing pulse is applied to the y-register (112) and the β-register (114). If the operation is made at this time with the timing of A+B=P, the input signal (x) is delayed by the period (P) from the output signal (y), and therefore, the writing operation and measuring are carried out at the same time. The writing to the RAM (102) is made by the pulses within the period (P). No writing is made during the period (C'), since the value of address (α) exceeds the maximum capacity.

As described above, this control system is featured by the advantage that the control objects with non-linear input-output characteristics are subjected to high-speed control through linear arrangement by measuring their input-output characteristics during the measuring mode, memorizing the data to the RAM and utilizing the RAM during the control mode period as an inverse function table memory.

SECOND EMBODIMENT

Figure 5:
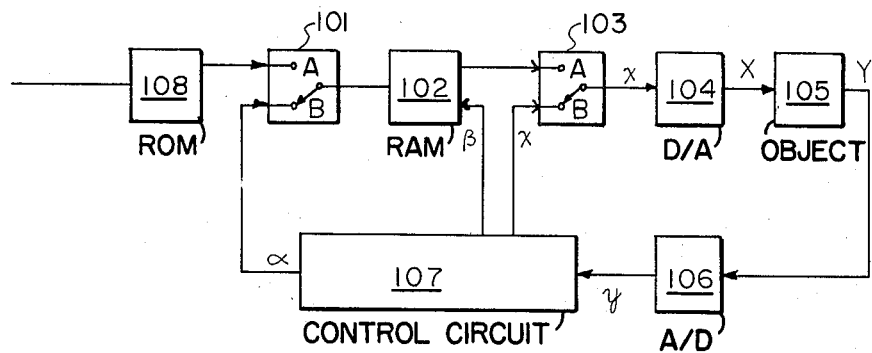
FIG. 5 is the block diagram of the second embodiment in which a read only memory (ROM) that functions as a table memory is provided at the input side of the control system.
Figure 6:
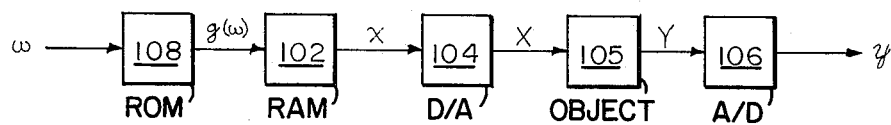
FIG. 6 is a principle drawing of the operation during the control mode period of the second embodiment.

The following description is for the 2nd embodiment as shown in FIG. 5 and FIG. 6, in which a ROM that functions as a table memory is provided to the input side of the control system. In the ROM (108), the data of a desired function are written. By utilizing it as a table memory, therefore, any desired function can be set freely. That is, the ROM (108) gives the value of freely set function g(ω) corresponding to the input (ω).

Since the selectors (101)(103) select B-contact during the measuring mode period (M), the principles and operation of control in this embodiment are the same as those of the first embodiment and the circuit composition is as shown in FIG. 3. During the control mode period (S), the selectors (101)(103) select the A-contact, and the composition of this circuit is as shown in FIG. 6. The digital input (ω) to the control system is given as the output g(ω) of the ROM (108) which is set at a desired function. By the output g(ω), the address of the RAM (102) is assigned and the data are given as the output (x). The data (x) are applied to the object to be controlled (105) by the D/A converter (104) as the analog output (X), then the output (Y) is generated to be converted into the digital output (y) by the A/D converter (106). From the equation (3): $\beta = f^{-1}(\alpha)$, the following equation is obtained:

$$x = f^{-1}(g(\omega))$$

From the equation (1), y=f(x), therefore the relation between the digital input to the control object (105) is;

$$y = f\{f^{-1}(g(\omega))\} = g(\omega)$$

Thus, the digital input (ω) to the control system and the digital output of the object to be controlled (105) can be set at any desired characteristic relation by the table memory ROM (108) which works as a arbitrary function.

As described above, it is possible by the system of this invention to make the input and output characteristics of the whole control system to any desired characteristics freely with no regard to the input-output characteristics of the object to be controlled. By replacing the ROM utilized as the table memory, it is also possible to change the input-output characteristics of the whole control system to a different characteristic freely.

THIRD EMBODIMENT

Figure 7:
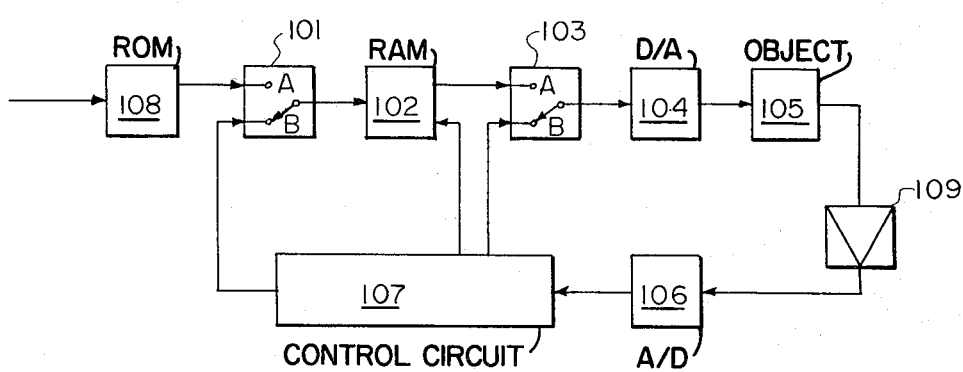
FIG. 7 is the block diagram of the third embodiment of this invention.

As shown in FIG. 7, by the control system according to this invention, it is possible to keep the input and output of the control system in proportional relation by providing an amplifier (109) in the feedback circuit of the output of the control object to the control system. Accordingly, the control function by this invention is made more universal and useful.

What is claimed is:

1. A digital control process having a measuring mode and a control mode comprising, during the measuring mode, inputting a digital measuring signal to an object to be controlled, obtaining from said object a digital measured output signal, and writing said digital measuring signal as data in a random access memory at a memory address corresponding to said digital measured output signal, and, during the control mode, inputting to the random access memory as an address a digital control signal related to a desired output signal of the object to be controlled, reading the data associated with said address, and supplying said data to the object to be controlled whereby said desired output signal is obtained and the object is controlled.

2. A digital control process according to claim 1, additionally comprising, during both the control mode and the measuring mode, amplifying said output of the object to be controlled.

3. A digital control process according to claim 1, wherein said desired output signal of the object to be controlled equals said digital control signal input to the random access memory.

4. A digital control process according to claim 2, wherein said desired output signal of the object to be controlled equals said digital control signal input to the random access memory.

5. A digital control process according to claim 1, wherein said digital control signal is related to said desired output signal by a table memory provided at the input of the random access memory.

6. A digital control process according to claim 2, wherein said digital control signal is related to said desired output signal by a table memory provided at the input of the random access memory.

* * * * *